United States Patent [19]

Yaginuma et al.

[11] Patent Number: 4,864,716

[45] Date of Patent: Sep. 12, 1989

[54] METHOD OF WINDING A.C. GENERATOR STATOR

[75] Inventors: Kenji Yaginuma, Katsuta; Youichi Sawahata, Hitachi; Tadayuki Suenobu, Katsuta, all of Japan

[73] Assignee: Hitachi, Ltd., Tokyo, Japan

[21] Appl. No.: 60,239

[22] Filed: Jun. 11, 1987

Related U.S. Application Data

[63] Continuation of Ser. No. 746,679, Jun. 20, 1985, abandoned.

[30] Foreign Application Priority Data

Jun. 20, 1984 [JP] Japan .................................. 59-125274

[51] Int. Cl.⁴ ............................................ H02K 15/00
[52] U.S. Cl. ...................................................... 29/596
[58] Field of Search ................. 29/596, 736; 140/92.1, 140/92.2; 310/180, 184, 207

[56] References Cited

U.S. PATENT DOCUMENTS 4,426,771  1/1984  Wang et al. ............................ 29/596
4,520,287  5/1985  Wang et al. ............................ 29/596

Primary Examiner—P. W. Echols
Attorney, Agent, or Firm—Antonelli, Terry & Wands

[57] ABSTRACT

To improve a coil packing ratio and reduce winding time of a A.C. generator stator, a wound coil of a first group is inserted in advance to coil inserting jig, with a wound coil of a second group having the same shape as that of the coil of the first group then being fitted to the coil inserting jig with predetermined pitch deviation. Thereafter, the wound coils of the first and second groups are simultaneously inserted into slots of the stator by the coil inserting jig.

6 Claims, 3 Drawing Sheets

METHOD OF WINDING A.C. GENERATOR STATOR

This is a continuation of application Ser. No. 746,679, filed June 20, 1985, now abandoned.

BACKGROUND OF THE INVENTION

This invention relates broadly to a method of winding an A.C. generator stator.

As vehicles generally become more compact and comfortable to drive, three-phase A.C. generators tend to become more compact and produce a higher output thereby requiring a higher packing ratio of the coil to be fitted into stator slots and a shorter winding time in order to reduce the production cost.

In, for example, Japanese Laid Open patent application No. 55804/1975, a concentrated winding method for winding a three-phase A.C. generator stator is proposed wherein one coil, having a predetermined number of turns, is inserted into a stator slot by a coil inserting jig.

A disadvantage of the above proposed method resides in the fact that the winding method does not provide a sufficiently high coil packing ratio.

In, for example, Japanese patent Laid Open application No. 136161/1981, a split winding method is proposed which provides for a high coil packing ratio by inserting split coils one by one into a staggered array of stator slots when a winding is effected.

However, a disadvantage of the last proposed method resides in the fact that a considerable winding time is required.

While Offenlegungschrift 23 48 641 proposes a split multi-layered wave winding and FIG. 5 herein illustrates how the current follows the wave winding, the publication does not illustrate a specific winding method.

The present invention relates to a method of winding a three-phase A.C. generator stator which provides a high coil packing ratio and shortens the winding time.

The present invention splits a stator coil for one phase into groups to form two lap wound coils or two wave wound coils per phase, then staggers the split wound coils by a predetermined pitch, fits them in advance to a coil inserting jig and thereafter simultaneously inserts these coils into stator slots with the coil inserting jig.

The two wound coils of the first, second and third phases are inserted into the slots of a stator in the manner described hereinabove. The two wound coils of the second and third phases are respectively inserted into the slots of the stator after the two wound coils of the first phase are arranged in the slots of the stator. Consequently, a coil packing ratio within the slots of the stator is increased as compared with prior art constructions.

BRIEF DESCRIPTION OF THE DRAWINGS

FIGS. 4C and 4D are perspective views illustrating the process of lap winding;

DETAILED DESCRIPTION

Figure 1A:
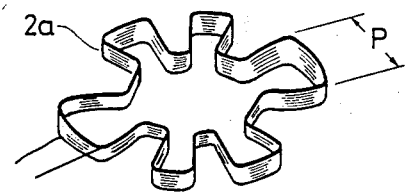
FIG. 1 is a schematic view illustrating a winding method for a split wave winding in accordance with the present invention.

Referring initially to FIG. 1A, a wave wound coil used for a winding corresponding to one phase of an A.C. generator stator has a toothed configuration with a pole pitch P, with a wave wound coil used for a wave winding 2B FIG. 10 having the same shape and the same pitch P as the coil winding 2a also being formed.

Figure 1C:
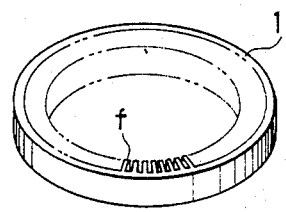
Figure 1B:
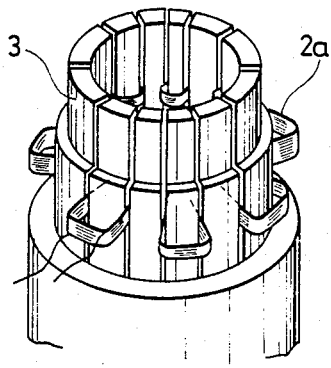
Figure 1D:
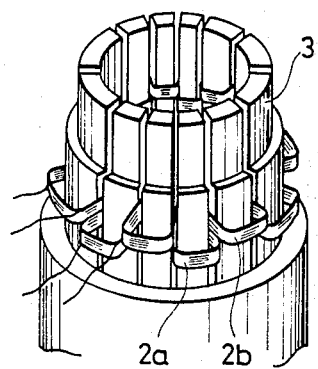

As shown in FIG. 1B, the coil winding 2a is fitted to a guide rod 3 of a coil inserting jig and, in FIG. 1D, the coil winding 2b is fitted to the guide rod 3 of the coil inserting jig in such a manner so as to be in a staggered relationship with respect to the coil winding 2a by a distance of the pole pitch P. As shown in FIG. 1C, the stator 1 is provided with a plurality of slots with the coils 2a, 2b in FIG. 1D being simultaneously shifted into the slot f shown in FIG. 1C by a conventional method such as, for example, that shown in FIG. 2 of the above-noted Japanese Laid Open patent application No. 55804/1975.

Figure 2:
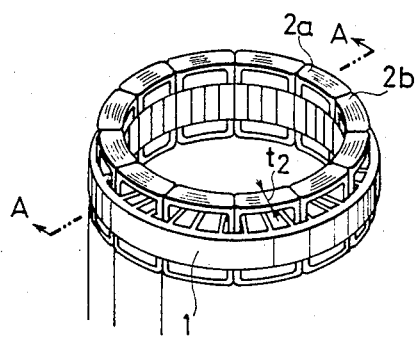
FIG. 2 is a perspective view of a coil which corresponds to one phase and is wound by the method shown in FIG. 1.
Figure 3:
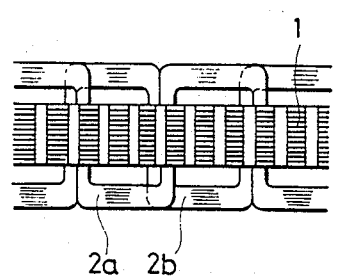
FIG. 3 is a sectional view taken along line A—A of FIG. 2.

In FIGS. 2 and 3, the wave windings 2a and 2b of the wave winding corresponding to one phase are shown stored separately in the stator slots f.

FIGS. 1 through 3 show the winding inserting method of the wave winding corresponding to one phase of the A.C. generator stator. The wave wound coils for three phases can be inserted, for example, by inserting the wave wound coils for the second and third phases by the method shown in FIG. 1 while they are being staggered from each other by two slots.

Though FIGS. 1B and 1D show the case where one each coils 2a, 2b is wound on the guide rod 3 of the coil inserting jig, the present invention is not particularly limited thereto. For example, it is possible to insert two each coils 2a, 2b to the positions at which the coils 2a and 2b are now fitted, as shown in FIGS. 1B and 1D, along the axial direction of the coil inserting jig, and then to fit them in the stator slots f.

Figure 4A:
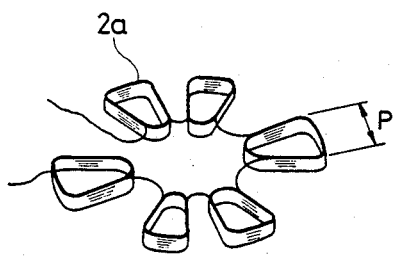
FIGS. 4A and 4B are perspective views illustrating a lap winding method for a split lap winding in accordance with the present invention.
Figure 4B:
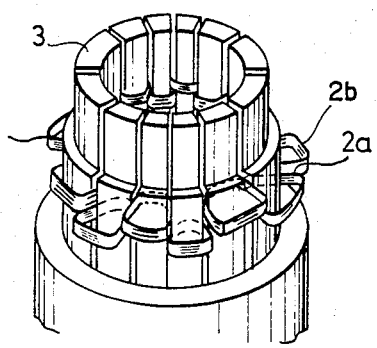
Figure 5:
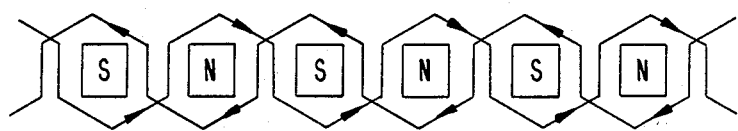
FIG. 5 represents current flow in a known wave winding.

FIG. 4A shows a method of fitting the lap winding 2a for one group of two split groups of a lap winding corresponding to one phase of the A.C. generator stator to the guide rod 3 of the coil inserting jig. The coils 2a and 2b (not shown) of the split lap winding shown in FIG. 4B, too, can be fitted in the stator slots f in accordance with the same procedures as those shown in FIGS. 1A through 1D.

The split lap winding shown in FIG. 4A, too, can be constructed in the multi-phase multi-layered construction in the same way as the split wound coils used for a multi-layered wave winding described above.

Since the present invention can constitute the split winding structure in the manner described above, it can reduce the width $t_2$ of the coil 2a or 2b shown in FIG. 2 when compared with the width of the conventional coil not employing a split winding structure. In accordance with the present invention, since a winding used for one phase is split into two wound coils 2a, 2b, and the split coils 2a and 2b are inserted into slots f of the stator 1 staggering the coil 2a with respect to the coil 2b by a width of one pole pitch P with respect to each other, the width $t_2$ of the coil 2a or 2b is reduced to one half as compared with a conventional structure of a coil in which a wound coil for one phase is inserted in the same slot of the stator 1. Therefore, the super-position of the coils for each phase can be reduced; hence, the coil packing ratio can be drastically improved. Moreover, the method of the present invention comprises arbitrarily dividing a predetermined number of turns, then distributing the coils according to the coil pitch P, fitting them in advance and sequentially in the coil inserting jig 3 and simultaneously inserting these coils into the corresponding stator slots 5 via the coil inserting jig 3. Therefore, the method of the present invention can drastically reduce winding time.

What is claimed is:

1. A method of winding an A.C. generator stator, comprising the steps of:

splitting a winding corresponding to a first phase of said A.C. generator stator into a first group winding and a second group winding having the same shape and the same pitch as said first group winding and shaping said windings into a form of wound coils wound according to a coil width equal to the winding pitch;

inserting said wound coils of said first group winding to guide rods of a coil inserting jig;

inserting said wound coil of said second group winding to said guide rods of said coil inserting jig such that said wound coil of said second group winding is inserted to said guide rods by staggering said wound coil of said first group winding by the width of one pole pitch;

jointly inserting said windings of both of said first group winding and second group winding inserted to said coil inserting jig into slots of said stator;

inserting wound coils of a first group winding and a second group winding of another phase to said guide rods of said coil inserting jig in the same manner as said first group winding and said second group winding of said first phase while said wound coils of said first group winding and said second group winding of said another phase are staggered from fitting positions said first group winding and second group winding of said first phase to said guide rods by a number of stator slots required for multi-phase A.C. generator stator winding; and jointly inserting said wound coils of said first group winding and second group winding of said another phase to said coil inserting jig into slots of said stator.

2. The method of winding an A.C. generator stator as defined in claim 1 further comprising respectively fitting windings of third and fourth groups having the same shape and the same pitch as those of said windings of said first and second groups to the same positions of said coil inserting jig to which said windings of said first and second groups are fitted.

3. The method of winding an A.C. generator stator as defined in claim 1, wherein said windings of both of said first and second groups are lap windings.

4. The method of winding an A.C. generator stator as defined in claim 2, wherein said windings of all of said first, second, third and fourth groups are lap windings.

5. The method of winding an A.C. generator stator as defined in claim 1, wherein said windings of said first and second groups are wave windings.

6. The method of winding an A.C. generator stator as defined in claim 2, wherein said windings of said first, second, third and fourth groups are wave windings.

* * * * *